US006655201B2

(12) United States Patent
Masson et al.

(10) Patent No.: US 6,655,201 B2
(45) Date of Patent: Dec. 2, 2003

(54) ELIMINATION OF MASS AIR FLOW SENSOR USING STOCHASTIC ESTIMATION TECHNIQUES

(75) Inventors: Christian G Masson, Puteaux (FR); Steven D Stiles, Clarkston, MI (US); Vivek Mehta, Bloomfield Hills, MI (US); Richard B Jess, Haslett, MI (US); Michael S Emmorey, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 09/951,586

(22) Filed: Sep. 13, 2001

(65) Prior Publication Data

US 2003/0046991 A1 Mar. 13, 2003

(51) Int. Cl.[7] .............................................. G01M 15/00
(52) U.S. Cl. ..................................... 73/118.2; 73/118.2
(58) Field of Search ........................... 73/118.2, 117.3; 123/478–482, 570, 571; 701/104

(56) References Cited

U.S. PATENT DOCUMENTS

| 4,750,352 A | 6/1988 | Kolhoff |
| 4,920,790 A | 5/1990 | Stiles et al. |
| 4,958,516 A | 9/1990 | Stiles et al. |
| 4,987,773 A | 1/1991 | Stiles et al. |
| 4,999,781 A | 3/1991 | Holl et al. |
| 5,094,213 A | 3/1992 | Dudek et al. |
| 5,150,692 A | 9/1992 | Trombley et al. |
| 5,270,935 A | 12/1993 | Dudek et al. |
| 5,273,019 A | * 12/1993 | Matthews et al. .......... 123/571 |
| 5,351,660 A | * 10/1994 | Logozzo .................... 123/73 V |

* cited by examiner

Primary Examiner—Kamand Cuneo
Assistant Examiner—Monica D. Harrison
(74) Attorney, Agent, or Firm—Christopher DeVries

(57) ABSTRACT

A method and apparatus for determining the mass air flow into an internal combustion engine without the use of a mass air flow sensor. Speed density and throttle position methods of estimating mass air flow are combined using a first Kalman filter. In one aspect of the invention, the input throttle position into the throttle position mass air flow estimate is the measured throttle position obtained from the throttle position sensor. In another aspect of the invention, the input throttle position into the throttle position mass air flow estimate is the output of a second Kalman filter, which uses as its inputs the measured throttle position obtained from the throttle position sensor and the desired throttle position obtained from the pedal position sensor.

13 Claims, 1 Drawing Sheet

ELIMINATION OF MASS AIR FLOW SENSOR USING STOCHASTIC ESTIMATION TECHNIQUES

BACKGROUND OF THE INVENTION

1. Field of the Invention

This invention relates, in general, to the determination of engine mass air flow and, in particular, to a method and apparatus for determining the mass air flow using stochastic estimation techniques, thereby eliminating the need for a mass air flow sensor.

2. Description of the Art

The control system of an internal combustion engine usually incorporates both a manifold air pressure (MAP) sensor and a mass air flow (MAF) sensor. These sensors serve as inputs to the engine controller to control the emission and performance characteristics of the engine. In particular, knowing the mass of air available for combustion within engine cylinders allows adjustment of critical engine parameters, particularly engine fueling.

Mass air flow sensors are commercially available and have been used with internal combustion engines in the past to provide the required information regarding the air mass available for combustion. At the present time, however, MAF sensors are relatively expensive as compared to other sensors used for engine control. Therefore, alternative techniques of deriving mass air flow have developed.

Two conventional techniques for calculating mass air flow without the use of MAF sensor exist. The speed density method of calculating mass air flow generally incorporates the output of the MAP sensor, a measure of the engine's speed, and intake air temperature. The throttle position method of calculating mass air flow generally incorporates the output of the throttle position sensor and engine speed, among other variables. While the speed density and throttle position methods of calculating mass air flow eliminate the expensive MAF sensor, they are also more inaccurate than using the MAP sensor. First, they may provide an incorrect estimation of air flow during throttle transient conditions because in the finite amount of time it takes to calculate air mass and adjust fuel input, the air flow can change dramatically due to the dynamic nature of an engine. Even during static situations, the use of these methods results in cycle-to-cycle measurement variations (noise) due to the pulsations caused in air flow as the engine draws air into its different cylinders and due to delays in processing sensor information. This noise has been shown to be detrimental to emissions in that a 1% noise increase in air flow measurement can result in a 15% HC increase.

Because of the increase in inaccuracies over the use of a MAF sensor, these traditional methods can result in a need for more expensive emission system hardware over that needed when the MAF sensor is used.

Thus, there is a need to determine the mass of air available for combustion within the cylinders of an internal combustion engine without the use of a MAF sensor. Further, the technique used should produce estimations of mass air flow at least as accurate as the MAF sensor.

SUMMARY OF THE INVENTION

The present invention is directed toward providing a method and apparatus for determining the mass of air available for combustion within the cylinders of an internal combustion engine, with sufficient accuracy to enable proper engine control, without requiring a mass air flow (MAF) sensor. The mass of air available for combustion is obtained by combining a throttle position mass air flow estimate with a speed density mass air flow estimate through a first Kalman filter.

According to one aspect of the invention, the input into the speed density mass air flow estimate is the output of a manifold air pressure (MAP) sensor, certain engine operating conditions, and a calibratable estimation of volumetric efficiency. The input into the throttle position mass air flow estimate is throttle position and certain engine operating conditions, together with compensation for the minimum mass air flow variation.

In a preferred aspect of the invention, the throttle position mass air flow estimate uses an estimated throttle position obtained from a second Kalman filter as its input throttle position. This throttle position Kalman filter has as its input the desired throttle position, provided by a pedal position sensor, and the measured throttle position, provided by the throttle position sensor. According to another aspect of the invention, the throttle position mass air flow estimate uses the measured throttle position from the throttle position sensor as its input throttle position.

In one aspect of the invention, once the mass air flow is determined as described above, it is reported to the engine controller for use in controlling certain engine parameters, particularly the air-to-fuel ratio.

The present invention eliminates the need for the expensive mass air flow sensor through the unique combination of a speed density mass air flow estimate and a throttle position mass air flow estimate using Kalman filtering techniques. The present invention is intended to reduce the cycle-to-cycle noise resulting from the use of either traditional method. Further, the use of Kalman filtering in mass air flow estimation is intended to reduce errors in air flow estimation resulting from throttle transient conditions. The present invention is thus intended to at least achieve the accuracy of the mass air flow sensor, potentially eliminating the need for a more expensive emission system than that needed when either traditional method is used alone.

BRIEF DESCRIPTION OF THE DRAWINGS

The various features, advantages, and other uses of the present invention will become more apparent by referring to the following detailed description and drawings in which.

DETAILED DESCRIPTION

Figure 1:
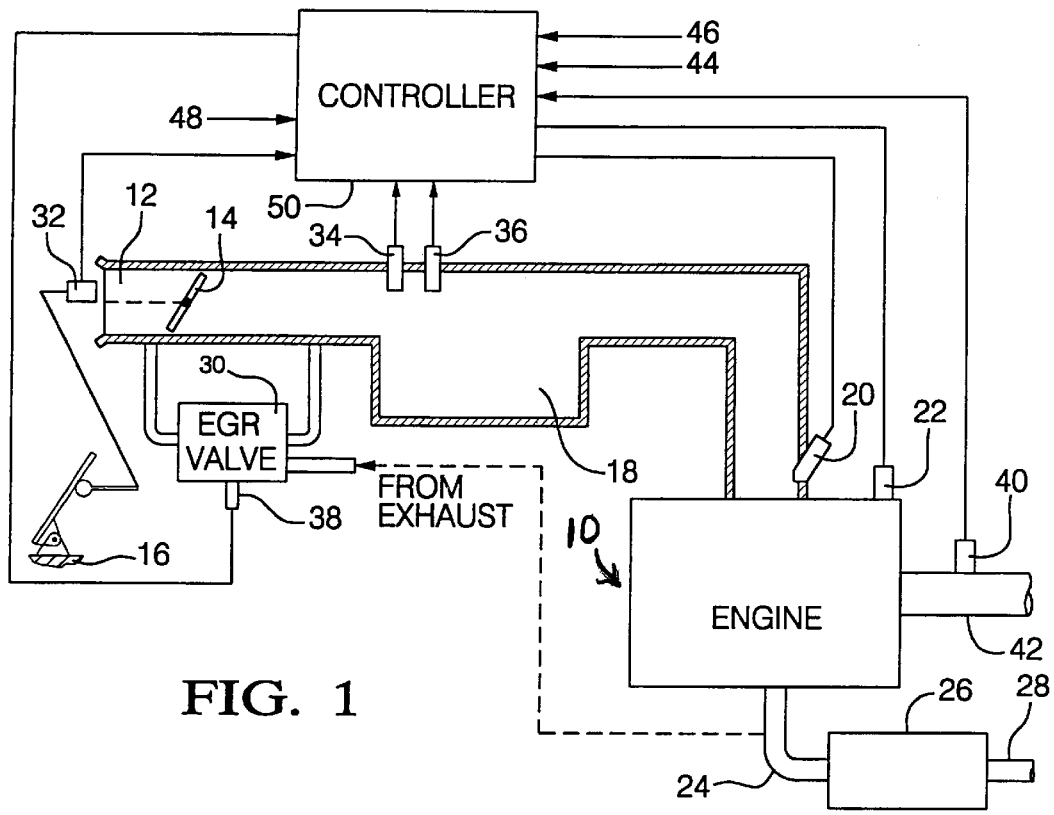
FIG. 1 is a pictorial diagram of an internal combustion engine, sensors and a controller in which the system for estimating a mass of air flow available for combustion in accordance with the present invention may be implemented.

Referring now to FIG. 1, air flows into an engine 10 through an intake 12. The air then flows through a throttle 14, which is controlled by an accelerator pedal of a car 16, to an intake manifold 18. From the intake manifold 18 intake air runners (not shown) direct the air into engine cylinders (not shown), where the air is combined into fuel-air mixtures and burned. The amount of fuel in the mixtures is controlled by fuel injectors 20, and the mixtures are ignited by a spark from spark plugs 22. After the air is burned in the cylinders, the exhaust gas flows through an exhaust gas conduit 24 and a catalytic device 26, finally releasing into the atmosphere through a tail pipe 28. A portion of the exhaust gas is fed back into the intake 12, typically through an exhaust gas recirculation (EGR) valve 30.

Associated with the engine are various conventional sensors known in the art, which provide typical signals related to engine control. Coupled to the throttle 14 is a throttle position sensor 32. The intake manifold 18 contains an air pressure sensor 34 for measuring manifold air pressure (MAP) and a temperature sensor 36, for measuring intake air temperature. An EGR sensor 38 indicates the position of the EGR valve 30. Engine speed is determined from a sensor 40, which is attached to and detects the rotations of the crankshaft 42. Other sensors, not shown in FIG. 1, provide an atmospheric barometric pressure signal 44 and a coolant temperature signal 46. A pedal position sensor (not shown) provides a pedal position signal 48, indicating the degree to which the accelerator pedal 16 is depressed in response to operator demand for engine output power.

An engine controller 50 is a conventional digital computer used by those in the art for engine control, and includes the standard elements of the central processing unit (CPU), random access memory, read only memory, analog to digital converter(s), input/output circuitry, and clock circuitry. The controller 50 is activated upon application of ignition power to an engine. When activated, the controller 50 carries out a series of operations stored in an instruction-by-instruction format in memory for providing engine control, diagnostic and maintenance operations. Signals from the previously mentioned sensors flow over the indicated paths and serve as inputs to the controller 50. Using these inputs, controller 50 performs appropriate computations and outputs, among other things, a fuel signal to fuel injectors 20 and a spark signal to spark plugs 22.

In order to effectively control fueling the engine 10, it is necessary to know the mass of air available in the engine cylinders at the time of combustion. In a common engine configuration, a mass air flow (MAF) sensor is disposed between the intake 12 and the throttle 14 to measure the air flow into the engine 10. It is the intent of this invention to eliminate the need for the MAF sensor.

Figure 2:
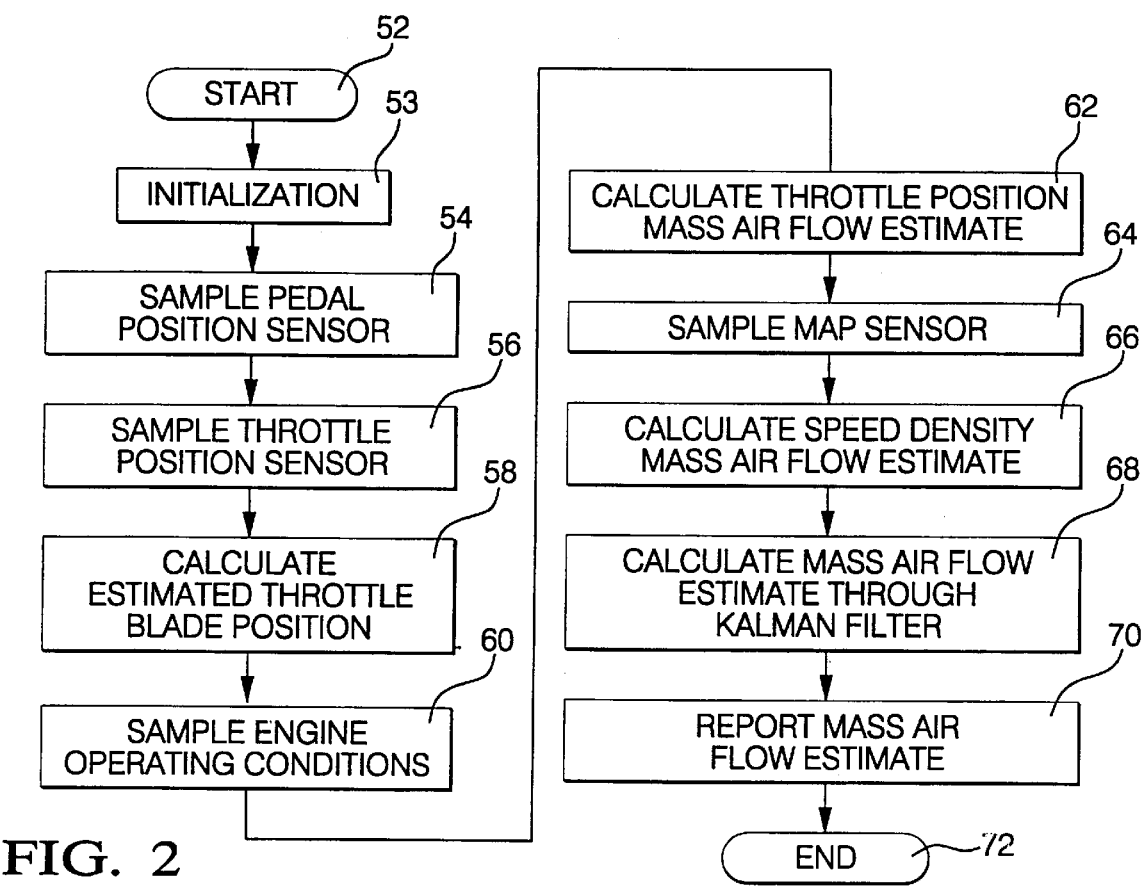
FIG. 2 represents a block diagram illustrating the operation of the system of FIG. 1 in determining mass air flow in accord with the principles of the present invention.

FIG. 2 is a diagram showing a means for deriving mass air flow without the use of a MAF sensor according to the present invention. More specifically, such a derivation is initiated at step 52 upon application of ignition power to a previously inactive controller 50 and proceeds to general initialization operations in step 53. Such initialization operations include setting pointers, flags, registers and RAM variables to their starting values. These starting values could be predetermined or learned and stored from previous operating events such that they can be used for the next event without having to relearn from a pre-established baseline.

Following general initialization operations, sampling of the variables used to calculate mass air flow begins. In a preferred aspect of the invention, in step 54, the desired throttle position is obtained from the pedal position sensor signal 48 and stored as $u_k^{TP}$, which represents the desired throttle position at time k. In step 56, the measured throttle position is obtained from the output of the throttle position sensor 32 and stored as $y_k^{TP}$, which represents the measured throttle position at time k. The sampling of these variables occurs at predetermined sampling intervals, typically 18.75 ms. These two quantities are then used as inputs into a first Kalman filter, hereinafter the throttle position Kalman filter, in step 58. A Kalman filter, unlike traditional state estimation techniques, accounts for the randomness of the system it is incorporated into when estimating its output.

Generally, the throttle position Kalman filter provides as its output an estimate of the throttle position at time k based on an estimate of throttle position at time k−1, desired and measured throttle positions from existing engine sensors, and adjustments based on the individual characteristics of the throttle position system of the engine. Specifically, the throttle position Kalman filter utilized in step 58 is mathematically represented by the following equations:

$$\hat{\underline{x}}_{k/k-1}^{TP} = A^{TP}\hat{\underline{x}}_{k-1/k-1}^{TP} + B^{TP}u_{k-1}^{TP}$$

$$\hat{\underline{x}}_{k/k}^{TP} = \hat{\underline{x}}_{k/k-1}^{TP} + L_k^{TP}(y_k^{TP} - C^{TP}\hat{\underline{x}}_{k/k-1}^{TP} - D^{TP}u_k^{TP})$$

$$\hat{y}_{k/k}^{TP} = C^{TP}\hat{\underline{x}}_{k/k}^{TP} + D^{TP}u_k^{TP}.$$

Matrices $A^{TP}$, $B^{TP}$, $C^{TP}$ and $D^{TP}$ are derived off-line and represent the relationship between the throttle position system inputs and outputs. They are calculated using classical least squares estimation techniques and a system model selected to minimize error between the calculated system output and the measured output. The optimal solution for the gain matrix $L_k^{TP}$ is computed off-line and minimizes errors between the measured system output and the predicted output. The values for $A^{TP}$, $B^{TP}$, $C^{TP}$, $D^{TP}$ and $L_k^{TP}$ range from −4 to +4.

The desired throttle position obtained in step 54, $u_k^{TP}$, and the measured throttle position obtained in step 56, $y_k^{TP}$, are incorporated into the Kalman filter to calculate $\hat{x}_{k/k}^{TP}$, which is an estimate of throttle position at time k based on current measurements. The time updated state estimate $\hat{x}_{k/k-1}^{TP}$, represents the estimate of throttle position at time k based on measurements at time k−1. In the first iteration, $\hat{x}_{k-1/k-1}^{TP}$, which is the estimate of throttle position at time k−1 based on measurements at time k−1, and $u_{k-1}^{TP}$, which is the desired throttle position at time k−1, are obtained through the initialization in step 53. After the first iteration, each value obtained for $u_k^{TP}$ is incorporated into the subsequent iteration as $u_{k-1}^{TP}$, and each value calculated for $\hat{x}_{k/k}^{TP}$ is incorporated into the subsequent iteration as $\hat{x}_{k-1/k-1}^{TP}$. The output of the throttle position Kalman filter is an estimate of throttle position at time k, given by $\hat{y}_{k/k}^{TP}$.

In step 60, certain engine operating conditions are sampled, such as engine speed and various environmental inputs. Typically, engine speed is sampled three times per engine revolution, and the environmental inputs are sampled at intervals ranging from 25–100 ms. In step 62, the sampled engine operating conditions are combined in a conventional throttle position mass air flow estimate with a predetermined minimum mass air flow variation and the throttle position estimate calculated in step 58. Such a method of estimating air flow based on throttle position is described in, for example, U.S. Pat. No. 4,750,352, which is incorporated herein in its entirety by reference. The throttle position mass air flow estimate at time k calculated and stored in step 62 is denoted $y_k^{MAF}$.

In an alternative aspect of the invention, the throttle position used in the throttle position mass air flow estimate in step 62 is not derived through the use of the Kalman filter in step 58. In this aspect of the invention, the throttle position used in step 62 is the measured throttle position sampled from the throttle position sensor 32.

In step 64 the output of the MAP sensor 34 is sampled and stored. Typically, the MAP sensor is sampled every 12.5 ms. In step 66, the output of the MAP sensor stored in step 64 and the engine conditions stored in step 60, together with a calibratable estimation of volumetric efficiency, are input into the calculation of a speed density based mass air flow estimate according to conventional techniques. The speed density mass air flow estimate at time k is stored in step 66 as $u_k^{MAF}$. Volumetric efficiency is a measure of how well the engine functions as an air pump, drawing air and fuel into the various cylinders. An engine's volumetric efficiency depends on various design perimeters such as piston size, piston stroke, and number of cylinders. One method of calculating the speed density mass air flow estimate is disclosed in U.S. Pat. No. 5,270,935, which is incorporated herein in its entirety by reference.

In step 68, the throttle position mass air flow estimate produced in step 62 and the speed density based mass air flow estimate produced in step 66 are incorporated into a second Kalman filter, the mass air flow Kalman filter, to produce a more accurate estimate of mass air flow. Generally, the mass air flow Kalman filter provides as its output an estimate of mass air flow at time k based on an estimate of mass air flow at time k−1, the speed density based mass air flow estimate, the throttle position mass air flow estimate, and adjustments based on the individual characteristics of the intake air system of the engine. Specifically, the mass air flow Kalman filter utilized in step 68 is mathematically represented by the following equations:

$$\hat{\underline{x}}_{k/k-1}^{MAF} = A^{MAF}\hat{\underline{x}}_{k-1/k-1}^{MAF} + B^{MAF}u_{k-1}^{MAF}$$

$$\hat{\underline{x}}_{k/k}^{MAF} = \hat{\underline{x}}_{k/k-1}^{MAF} + L_k^{MAF}(y_k^{MAF} - C^{MAF}\hat{\underline{x}}_{k-1}^{MAF} - D^{MAF}u_k^{MAF})$$

$$\hat{y}_{k/k}^{MAF} = C^{MAF}\hat{\underline{x}}_{k/k}^{MAF} + D^{MAF}u_k^{MAF}.$$

Matrices $A^{MAF}$, $B^{MAF}$, $C^{MAF}$ and $D^{MAF}$ are derived off-line and represent the relationship between the intake air system inputs and outputs. They are calculated using classical least squares estimation techniques and a system model selected to minimize error between the calculated system output and the measured output. The optimal solution for the gain matrix $L_k^{MAF}$ is computed off-line and minimizes errors between the measured system output and the predicted output. The values for $A^{MAF}$, $B^{MAF}$, $C^{MAF}$, $D^{MAF}$ and $L_k^{MAF}$ range from −4 to +4.

The throttle position mass air flow estimate produced in step 62, $y_k^{MAF}$, and the speed density based mass air flow estimate produced in step 66, $u_k^{MAF}$, are incorporated into the Kalman filter to calculate $\hat{\underline{x}}_{k/k}^{MAF}$, which is an estimate of mass air flow at time k based on current measurements. The time updated state estimate, $\hat{\underline{x}}_{k/k-1}^{MAF}$, represents the estimate of mass air flow at time k based on measurements at time k−1. In the first iteration $\hat{\underline{x}}_{k-1/k-1}^{MAF}$, which is the estimate of mass air flow at time k−1 based on measurements at time k−1, and $u_{k-1}^{MAF}$, which is the speed density based mass air flow estimate at time k−1, are obtained through the initialization in step 53. After the first iteration, each value obtained for $u_k^{MAF}$ is incorporated into the subsequent iteration as $u_{k-1}^{MAF}$, and each value calculated for $\hat{\underline{x}}_{k/k}^{MAF}$ is incorporated into the subsequent iteration as $\hat{\underline{x}}_{k-1/k-1}^{MAF}$. The output of the mass air flow Kalman filter is an estimate of mass air flow at time k, given by $\hat{y}_{k/k}^{MAF}$.

In step 70, the mass air flow estimate is reported to the engine controller 50 for use in calculating engine fueling. The routine ends at step 72. The routine then begins again based on a predetermined calculation interval until ignition power is turned off.

The present invention applies Kalman filtering techniques to uniquely combine a throttle position mass air flow estimate and a speed density based mass air flow estimate. The optimal combination of these two pieces of information is intended to reduce the cycle-to-cycle noise resulting from traditional estimates of mass air flow. The technique is also intended to reduce errors in air flow estimation during throttle transient conditions.

What is claimed is:

1. A method of calculating a mass air flow into an intake manifold of an internal combustion engine having an engine controller controlling fuel flow into the engine, comprising the steps of:
    calculating a speed density mass air flow estimate;
    calculating a throttle position mass air flow estimate; and
    calculating mass air flow by combining the speed density mass air flow estimate and the throttle position mass air flow estimate using a first Kalman filter.

2. The method according to claim 1, further comprising the step of reporting the mass air flow to the engine controller.

3. The method according to claim 1 wherein the step of calculating the throttle position mass air flow estimate is performed using an input throttle position, sampled engine operating conditions, and a predetermined minimum mass air flow variation.

4. The method according to claim 3 wherein the input throttle position is a measured throttle position from a throttle position sensor.

5. The method according to claim 3 wherein the input throttle position is an output of a process comprising the steps of:
    obtaining a desired throttle position from a pedal position sensor,
    obtaining a measured throttle position from a throttle position sensor; and
    combining the desired throttle position with the measured throttle position in a second Kalman filter.

6. The method according to claim 1 wherein the step of calculating the speed density mass air flow estimate is performed by using a manifold air pressure sensor, sampled engine operating conditions, and a calibratable estimation of volumetric efficiency.

7. An apparatus for calculating a mass air flow into an intake manifold of an internal combustion engine having an engine controller controlling fuel flow into the engine, comprising:

means for calculating a speed density mass air flow estimate;

means for calculating a throttle position mass air flow estimate; and means for calculating mass air flow by combining the speed density mass air flow estimate and the throttle position mass air flow estimate using a first Kalman filter.

8. The apparatus according to claim 7, further comprising means for reporting the mass air flow to the engine controller.

9. The apparatus according to claim 7 wherein the means for calculating the throttle position mass air flow estimate comprises an input throttle position, sampled engine operating conditions, and a predetermined minimum mass air flow variation.

10. The apparatus according to claim 9 wherein the input throttle position comprises a measured throttle position from a throttle position sensor.

11. The apparatus according to claim 9 wherein the input throttle position is an output of a process comprising:

means for obtaining a desired throttle position from a pedal position sensor, means for obtaining a measured throttle position from a throttle position sensor; and means for combining the desired throttle position with the measured throttle position in a second Kalman filter.

12. The apparatus according to claim 7 wherein the means for calculating the speed density mass air flow estimate comprises a manifold air pressure sensor, sampled engine operating conditions, and a calibratable estimation of volumetric efficiency.

13. A method of calculating a mass air flow into an intake manifold of an internal combustion engine having an engine controller controlling fuel flow into the engine, comprising the steps of:

calculating a speed density mass air flow estimate;

calculating a throttle position mass air flow estimate; and calculating mass air flow independent of a mass air flow sensor by combining the speed density mass air flow estimate and the throttle position mass air flow estimate using a first Kalman filter.

* * * * *